United States Patent
Feldman et al.

(10) Patent No.: US 10,205,890 B2
(45) Date of Patent: Feb. 12, 2019

(54) SYSTEMS, METHODS, AND DEVICES FOR RENDERING IN-VEHICLE MEDIA CONTENT BASED ON VEHICLE SENSOR DATA

(71) Applicant: Ford Global Technologies, LLC, Dearborn, MI (US)

(72) Inventors: Casey Bryan Feldman, Sunnyvale, CA (US); Madeline J Goh, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/219,104

(22) Filed: Jul. 25, 2016

(65) Prior Publication Data

US 2018/0027189 A1    Jan. 25, 2018

(51) Int. Cl.
*H04N 5/278* (2006.01)
*H04R 29/00* (2006.01)
*H04S 7/00* (2006.01)

(52) U.S. Cl.
CPC ............ *H04N 5/278* (2013.01); *H04R 29/00* (2013.01); *H04S 7/302* (2013.01); *H04R 2499/13* (2013.01); *H04S 2400/11* (2013.01)

(58) Field of Classification Search
CPC .................................................. H04N 5/278
See application file for complete search history.

(56) References Cited

U.S. PATENT DOCUMENTS

| | | | |
|---|---|---|---|
| 7,920,071 B2 | 4/2011 | Baillot | |
| 8,941,690 B2 | 1/2015 | Seder | |
| 2006/0044479 A1* | 3/2006 | Heo | H04N 5/445 348/738 |
| 2006/0069548 A1* | 3/2006 | Matsuura | G01C 21/3629 704/200.1 |
| 2008/0125103 A1 | 5/2008 | Mock | |
| 2010/0253918 A1 | 10/2010 | Seder | |
| 2012/0173069 A1 | 7/2012 | Tsimhoni | |
| 2013/0083061 A1 | 4/2013 | Mishra | |
| 2013/0103753 A1* | 4/2013 | Xu | H04H 20/93 709/203 |
| 2014/0040016 A1 | 2/2014 | Amla | |
| 2014/0295307 A1* | 10/2014 | Toida | B60L 1/003 429/432 |
| 2015/0062168 A1 | 3/2015 | Ng-Thow-Hing | |
| 2015/0097864 A1 | 4/2015 | Alaniz | |
| 2015/0100179 A1 | 4/2015 | Alaniz | |

* cited by examiner

*Primary Examiner* — Samira Monshi
(74) *Attorney, Agent, or Firm* — David R. Stevens; Stevens Law Group (57) ABSTRACT

A system for providing media content in a vehicle includes a content component, a noise component, and a closed captioning component. The content component is configured to receive content from a content provider, wherein the content is configured for rendering by the media system of a vehicle. The noise component is configured to determine a noise level within a cabin of the vehicle. The closed captioning component is configured to, in response to determining that the noise level exceeds a threshold, trigger display of closed captioning for the content.

20 Claims, 8 Drawing Sheets

SYSTEMS, METHODS, AND DEVICES FOR RENDERING IN-VEHICLE MEDIA CONTENT BASED ON VEHICLE SENSOR DATA

TECHNICAL FIELD

The disclosure relates generally to methods, systems, and apparatuses for rendering media within a vehicle and more particularly relates rendering media based on current events and environment for a vehicle.

BACKGROUND

Automobiles provide a significant portion of transportation for commercial, government, and private entities. Autonomous vehicles and driving assistance systems are currently being developed and deployed to provide safety features, reduce an amount of user input required, or even eliminate user involvement entirely. For example, some driving assistance systems may drive a vehicle from one location to another without user input or may provide assistance to a user as a human drives. These systems often require knowledge of an environment, such as current driving conditions obtained through sensors or wireless network communication, and/or such as location or roadway information available from locally or remotely stored map data.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

As vehicles become more intelligent and provide automated or assisted driving features, increased amounts of visual or audio media may be consumed during driving. Especially in automated driving situations, drivers are expected to have more free time in which entertainment might be a compelling source of engagement.

Applicants have recognized that vehicles provide a unique environment in which opportunities for new techniques for achieving storytelling and active passenger participation is possible. Applicants present systems, methods, and devices for using sensor data to provide an immersive scene for vehicle passengers. In one embodiment, sensor data from vehicle sensors is used to take real-time events, objects, and situations into account and provide an augmented storytelling environment. A media system including display and audio devices may be used to display audio and/or visual content that has been modified or adapted based on the real-time events, objects and situations. Visual content may be displayed on windows, displays, or other surfaces within the vehicle.

According to one embodiment, a system for providing media within a vehicle includes a media system for rendering one or more of audio or visual content. The system includes one or more vehicle sensors. The vehicle sensors may include the same sensors used by an automated driving system or driver assistance system. The system may also include a vehicle information component, a scene status component, and a content component. The vehicle information component is configured to generate vehicle information about an environment or status of the vehicle based on sensor data from the one or more vehicle sensors. The scene status component is configured to provide the vehicle information to a content provider. The content component is configured to receive content from the content provider, wherein the content is configured for rendering by the media system of the vehicle based on the vehicle information. The content provider also provides the content to the media system of the vehicle for rendering.

According to another embodiment, a system for providing media within a vehicle includes a media system for rendering one or more of audio or visual content. The system may also include a content component, a noise component, and a closed captioning component. The content component is configured to receive content from a content provider, wherein the content is configured for rendering by the media system of a vehicle. The noise component is configured to determine a noise level within a cabin of the vehicle. The closed captioning component is configured to, in response to determining that the noise level exceeds a threshold, trigger display of closed captioning for the content.

In one embodiment, an application program interface (API) is provided for content providers to interact with a media system of a vehicle. For example, a content provider, such as a DVD player, mobile computing device, or other source of content may interface with the API to provide content to be displayed in a vehicle environment. Visual content may be displayed on surfaces such as a windshield, windows, moon roof, or any other mirrored or reflective surface. In one embodiment content may be displayed on walls, ceilings, or other portions of an interior of the vehicle. Audio content may be played on one or more speakers. Content providers may not only provide data for playback, but may also receive data about the current environment, events, or situation of the vehicle in which content is to be displayed. This allows content producers and content providers to operate within a broader range of constraints to tell their story in a developer friendly way. Specifically, content may be modified to be responsive to data from sensors, or data derived from sensors. Thus, at least some embodiments recycle/reuse data that is already being used for perception and control navigation for the vehicle for providing entertainment or other content.

In one embodiment, a vehicle is able to communicate real-time information to a content provider via an application interface. Thus, the production of a story could provide alternative scenes and scenarios by which to display the story content to passengers. In augmented reality viewings, providing a given array of abstracted sensor data to producers of content, the producers could prepare multiple scenes to tell their story under various real-time conditions. Thus, how the content is presented may vary depending on the sensor data or abstracted vehicle information. In one embodiment, available scene templates and object variables are determined based on vehicle sensor data and provided from the vehicle to the content producer. The content provider, based on rules determined and or encoded into a content or program by a content producer, picks a way to prepare a scene for passengers in any given real-time environment.

Example sensor data that may be used to determine available templates or vehicle information include data from a camera, a light detection and ranging (LIDAR) system, a radar system, a positioning system, an inertial measurement unit, rain sensor, ambient light sensor, clock, or the like. The sensor data from these sensors may then be processed to generate vehicle information. The vehicle information may indicate information about events, environment, or the like of the vehicle. The vehicle information may include abstracted information that is useful to the content provider and/or the media system in determining what type of content to display/render or where/how to render the content. In one embodiment, confidence levels for the vehicle information may also be provided. Based on this information, a content provider can make decisions to determine what space is available and how best to display it. For example, the content provider may select content that would fit best within the available space for the current conditions.

Figure 1:
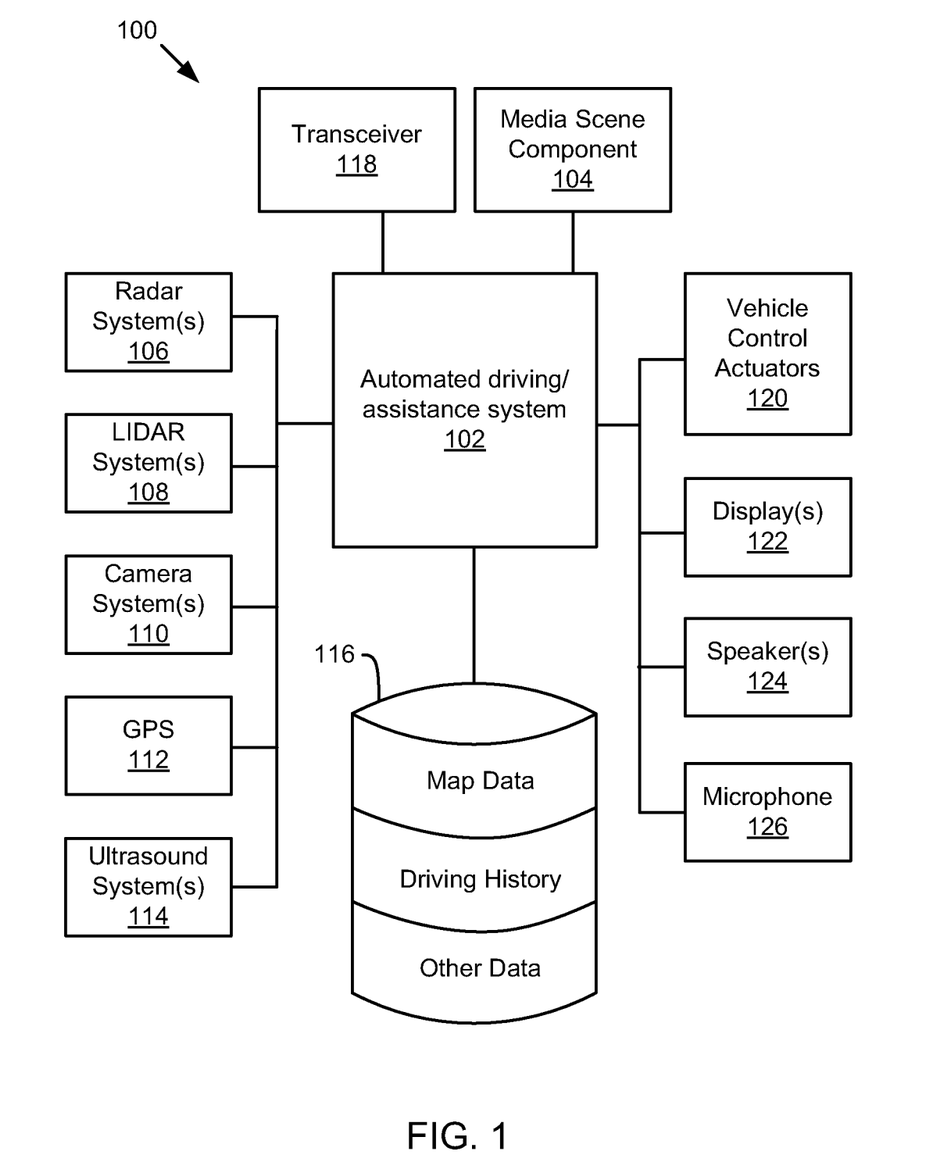
FIG. 1 is a schematic block diagram illustrating an implementation of a vehicle control system that includes an automated driving/assistance system and a media scene component, according to one implementation.

Referring now to the figures, FIG. 1 illustrates an example vehicle control system 100 that may be used for automated or assisted driving and/or context sensitive content presentation. The vehicle control system 100 includes an automated driving/assistance system 102 that may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system. The automated driving/assistance system 102 may use data from one or more sensors to determine how to control the vehicle and may also use the data to determine how to display visual or audio content for one or more passengers and/or a driver of a vehicle.

The vehicle control system 100 may include vehicle control actuators 120 to control various aspects of the driving of the vehicle, such as electric motors, switches or other actuators, to control braking, acceleration, steering or the like. The vehicle control system 100 may also include one or more displays 122, speakers 124, or other devices so that notifications or media content may be provided to a human driver or passenger. The vehicle control system 100 may also include a microphone 126 within a cabin, engine compartment, or other location of the vehicle to detect sounds in or around the vehicle. The microphone 126 may be used to detect voice commands of a driver or passenger. A display 122 may include a heads-up display, dashboard display or indicator, a display screen, or any other visual indicator, which may be seen by a driver or passenger of a vehicle. Projection displays may be used for displaying images on windows (such as a windshield, a side window, a rear window, and/or a ceiling window) or any other reflective surface in the vehicle. The speakers 124 may include one or more speakers of a sound system of a vehicle or may include a speaker dedicated to driver notification or entertainment.

In one embodiment, the automated driving/assistance system 102 is configured to control driving or navigation of a parent vehicle. For example, the automated driving/assistance system 102 may control the vehicle control actuators 120 to drive a path on a road, parking lot, driveway, or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time.

The sensor data, or other data, may also be used to provide an immersive entertainment or other media experience. For example, data used by the automated driving/assistance system 102 may be reused by a media scene component 104 to provide content that is responsive to the current environment or conditions of the vehicle. In one embodiment, the media scene component 104 provides an API to receive requests for and provide vehicle information that includes information about a current environment or condition of the vehicle. For example, the API may be accessible to a content provider system or program. The content provider system or program may, based on the vehicle information, determine what content to present and how to present the content for the user. For example, content may include branching storylines or the like based on events that occur with the vehicle during driving.

In one embodiment, the media scene component 104 may determine values for parameters or other information that may be useful for determining how to select or render content. The sensor data may be used to determine a location on a display that corresponds to a location of a horizon line for a passenger or driver of a vehicle. For example, the location of the horizon line may be used to display augmented reality content that appears to occur at the horizon or above the horizon. The sensor data may be used to determine an aspect ratio for an available display area. For example, the aspect ratio may determine what content is displayed and/or how it is displayed. The sensor data may be used to determine a location of free space with respect to a display. For example, the location of free space may correspond to an area of a window or windshield where there are no objects from the perspective of a passenger so that images can be clearly displayed in that area. The sensor data may be used to determine the types of objects present around the vehicle. For example, objects within view of the passenger may be used as part of the content in an augmented reality display. The sensor data may be used to perform depth mapping. For example, distances to other objects may be helpful in determining where data can be displayed without obstructing objects that are within proximity of the vehicle. The sensor data may be used to determine weather conditions, such as determining if there is any precipitation, the presence of wind, or the like. The sensor data may be used to determine a current geographic location of the vehicle. The sensor data may be used to determine content guides, such as limits on where data may be displayed, how brightly content should be displayed to be viewable and comfortable to passenger's eyes, or the like. The sensor data may be used to determine a current speed or velocity of the vehicle, which may be used to control how and where content is displayed. The sensor data may be used to determine a driving time before arriving at a destination. For example, the driving time may be used to determine what content can be displayed and/or completed before a passenger needs to exit the vehicle.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
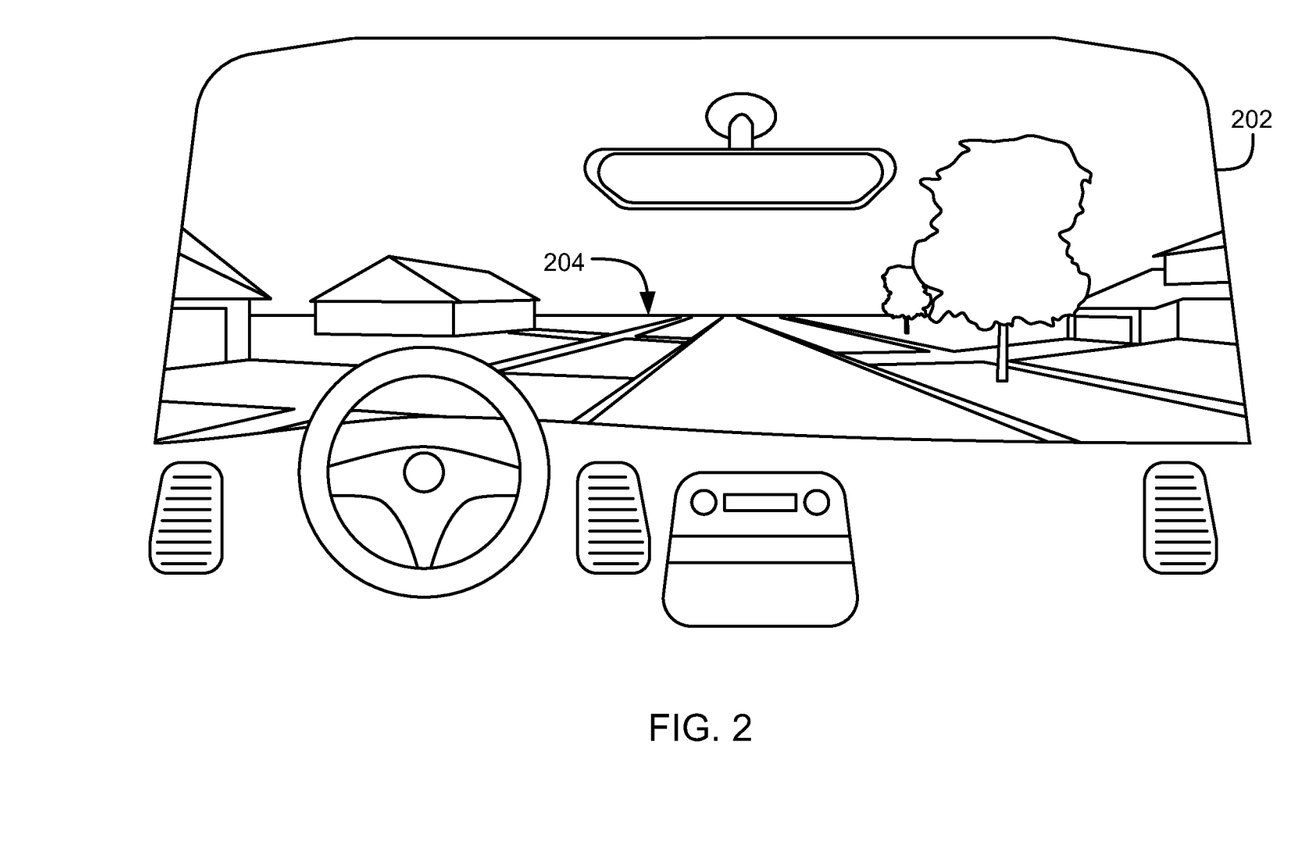
FIG. 2 illustrates a view through a windshield from a vehicle cabin, according to one implementation.

Referring now to FIG. 2, a view through a windshield 202 from within a vehicle cabin is illustrated. In one embodiment, a projector may be used to display content on the windshield for viewing by a passenger or driver. For example, a heads-up display that projects or reflects images off the glass of the windshield 202 may be formed to display images, data, video, or other type of visual content. In one embodiment, video, movies, or other motion content may be displayed on the windshield for entertainment or informational purposes. During automated driving, the whole windshield 202 may be used for movie and/or interactive content. For example, when no user input is required to drive a vehicle, a person sitting in a driver's seat may be free to consume media content and may not require a clear view of a roadway. In one embodiment, when a human is driving the vehicle content may be displayed in regions that do not block the driver's view. If a vehicle is under autonomous control and needs to be returned to human control, display of content may move to edges of the windshield 202 or regions that do not block the driver's view and then transfer control over to the driver.

During driving of the vehicle, vehicle sensors may gather vehicle information that includes information about the vehicle itself as well as about the environment. Information about the vehicle itself may include information such as speed, location, engine RPMS, inertial or acceleration measurements, noise level, or the like. Information about the environment may include images, LIDAR data, radar data, ultrasound data, light levels, or other data about an environment of the vehicle. For example, images of surroundings of the vehicle in one or more directions may be obtained. Sensor data may include any data that is acquired by a vehicle or autonomous driving/assistance system, such as information used by the autonomous driving/assistance system to make decisions during driving. This data may also be used for controlling what type of content is displayed in the vehicle and/or how it is displayed. In one embodiment, sensor data may be processed or analyzed to generate specific parameters that may be useful for determining where and how to render audio or visual content. For example, based on an image captured by a camera, a media scene component 104 may identify a location of the horizon 204. The media scene component 104 may also determine a region on the windshield 202 that corresponds to the horizon 204. Based on the location of the horizon 204 with respect to the windshield 202, content providers may be able to display images or content that sits on or above the horizon 204. For example, augmented reality content may be displayed such that it "sits" on the horizon 204 or gives the appearance of objects moving or interacting on the horizon 204. In one embodiment, the media scene component 104 does not make decisions about how content is to be displayed, but provides vehicle information so that a content provider can select or determine, based on a set of predefined rules, how to display the content. In one embodiment, the media scene component 104 may provide any other information about regions surrounding the vehicle or other information to allow content providers to provide an augmented reality, or other immersive content. For example, information about detected objects, free space for displaying content, or other data may be obtained and provided to a content provider. In one embodiment, the media scene component 104 may determine regions within a display region or display (such as within the windshield 202) where content should or should not be displayed.

Figure 3:
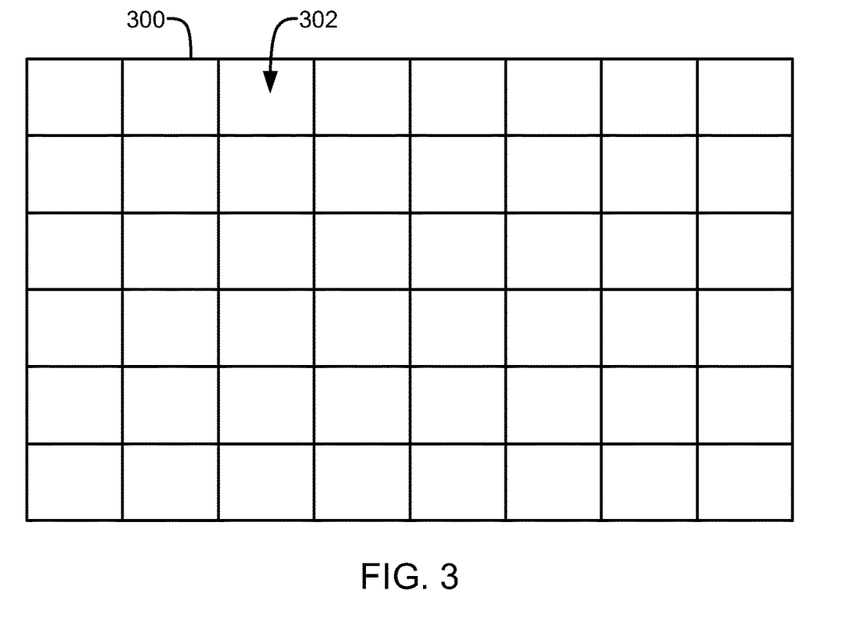
FIG. 3 illustrates a logical grid for dividing up a window or other display region, according to one implementation.

FIG. 3 is a schematic diagram illustrating how a window, display, or other display region may be logically divided into a grid 300. For example, the windshield 202 of FIG. 2 may be logically divided into a plurality of sections 302. Based on the grid 300, the media scene component 104 may identify areas within the grid 300 that are or are not suitable for certain types of content. The media scene component 104 may then provide an indication to a content provider regarding whether certain types of content should ideally be displayed in certain sections. For example, each section may be assigned a confidence value for whether it corresponds to free space with respect to a display. For example, the location of free space may correspond to an area of a window or windshield where there are no objects from the perspective of a passenger so that images can be clearly displayed in that area. Sections 302 may also be assigned a label indicating what types of objects are present in that section. When neighboring sections have a similar value or label, a content provider may be able to treat them as a single larger section. Thus, an indication of what is present in each section 302 of a grid 300 or what can be displayed in each section 302 of a grid 300 may indicate not only where content may be displayed, but also an aspect ratio (length to height ratio) for that region.

Figure 4:
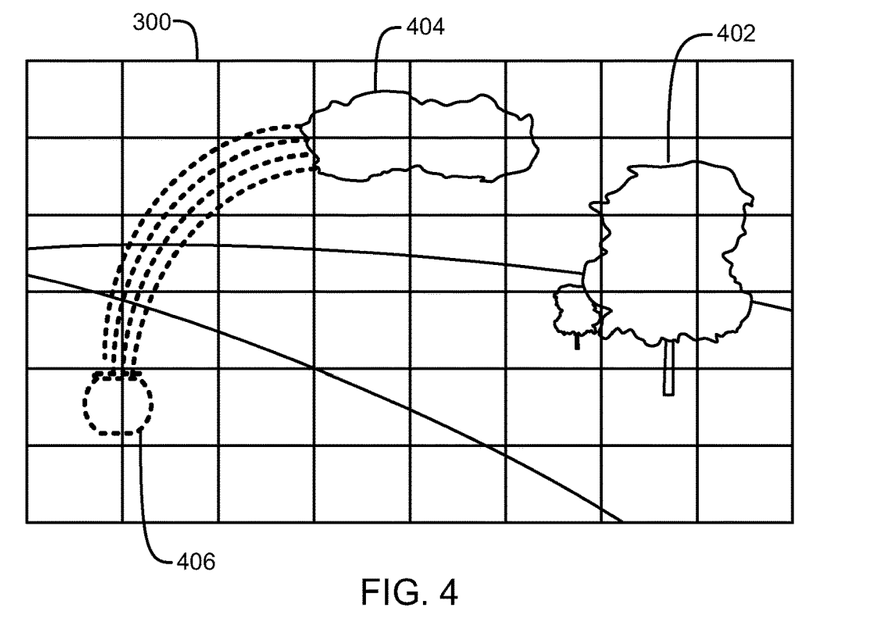
FIG. 4 illustrates a view divided up into a logical grid with displayed content, according to one implementation.

FIG. 4 illustrates a view through a window or windshield that is logically divided using a grid 300. On the right side, there are some trees 402 and near the top middle are some clouds 404. The media scene component 104 may detect and identify the trees 402 as trees and the clouds as clouds 404 and provide an indication to a content provider of their presence, object type, and location. The media scene component 104 may also indicate that there is more free space on the left side of the view. Based on this information a content provider may generate visual content 406 for display on the windshield or window (illustrated with dotted lines to distinguish from real-world content). Due to its knowledge of the location of other objects, the content provider can generate immersive augmented reality or virtual reality content that appears to fit into the view. For example, the content 406 represents a computer generated image of a rainbow that extends between the real world clouds 404 and a computer generated image of a pot of gold. In one embodiment, full stories or depictions may be displayed in an augmented reality manner so that the occurrences in a store appear to occur in an environment surrounding the vehicle.

Figure 5:
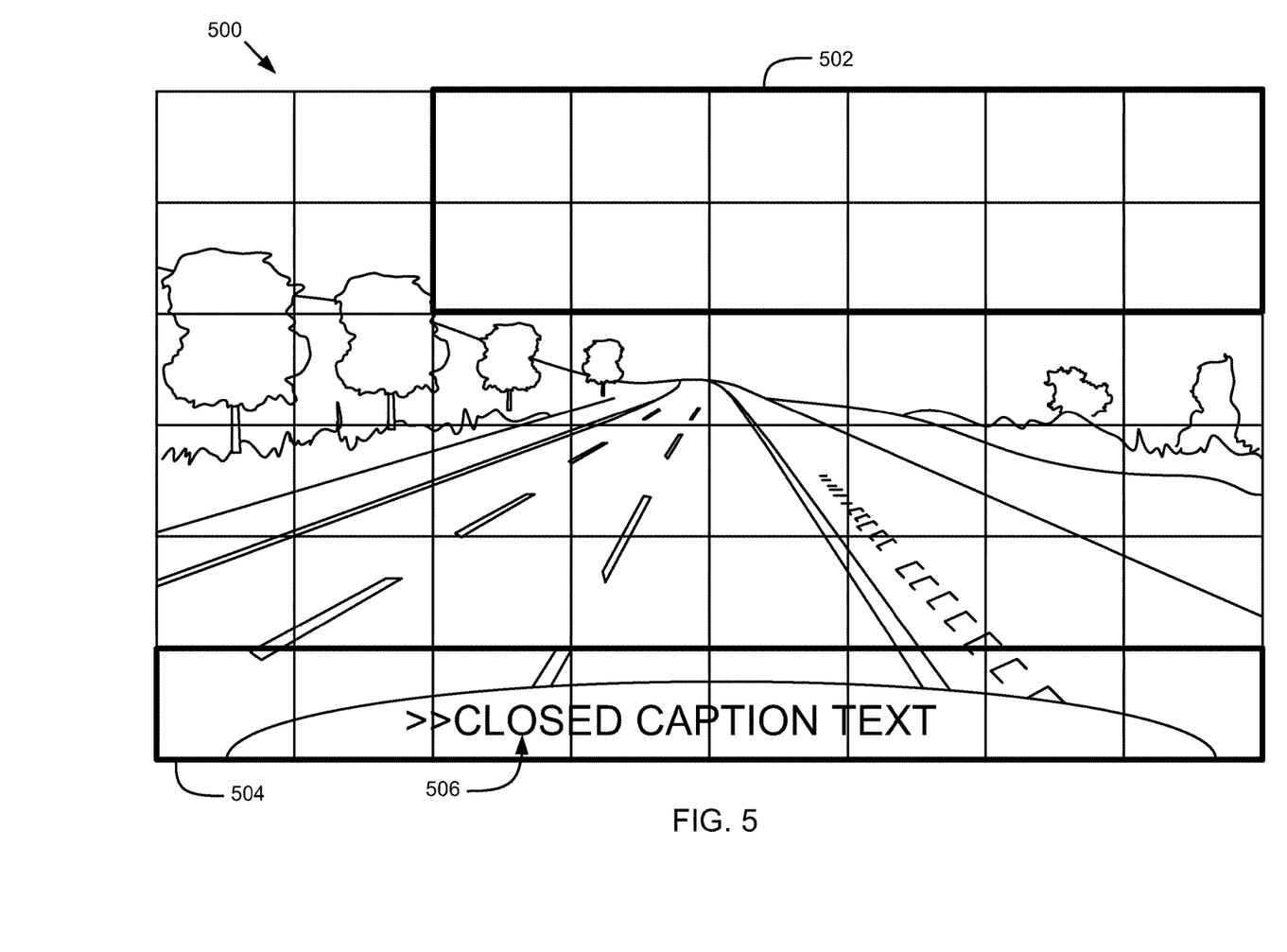
FIG. 5 illustrates another view divided up into a logical grid, according to one implementation.

FIG. 5 illustrates another view 500 through a window or windshield. Using object detection and image processing the media scene component 104 may identify a first region 502 (indicated by the bold rectangular section at the top right of the figure) as corresponding to free space or sky. The media scene component 104 may also identify a second region 504 (also indicated by the bold rectangular section at the bottom of the figure) as corresponding to free space or a hood region of a vehicle. For example, when needed, closed caption text 506 may be displayed in the second region 504. The media scene component 104 may identify these regions and feed a matrix for a value for each section of the view 500 indicating whether they correspond to free space to a content provider. A plurality of different matrices may be generated and provided to the content provider including a matrix identifying what regions include a roadway, other vehicles, or other types of objects in the view/environment.

In one embodiment, the views of FIGS. 4 and 5 may represent a view a passenger or driver of a vehicle experiences within the vehicle. For example, the camera system(s) 110 of FIG. 1 may include cameras that are located on or within the vehicle and which may be used to approximate or predict a view that a human within the vehicle will experience. Thus, the views may allow a content provider to display content within a region of a window or windshield such that the content appears to fit into the view of the human.

Figure 6:
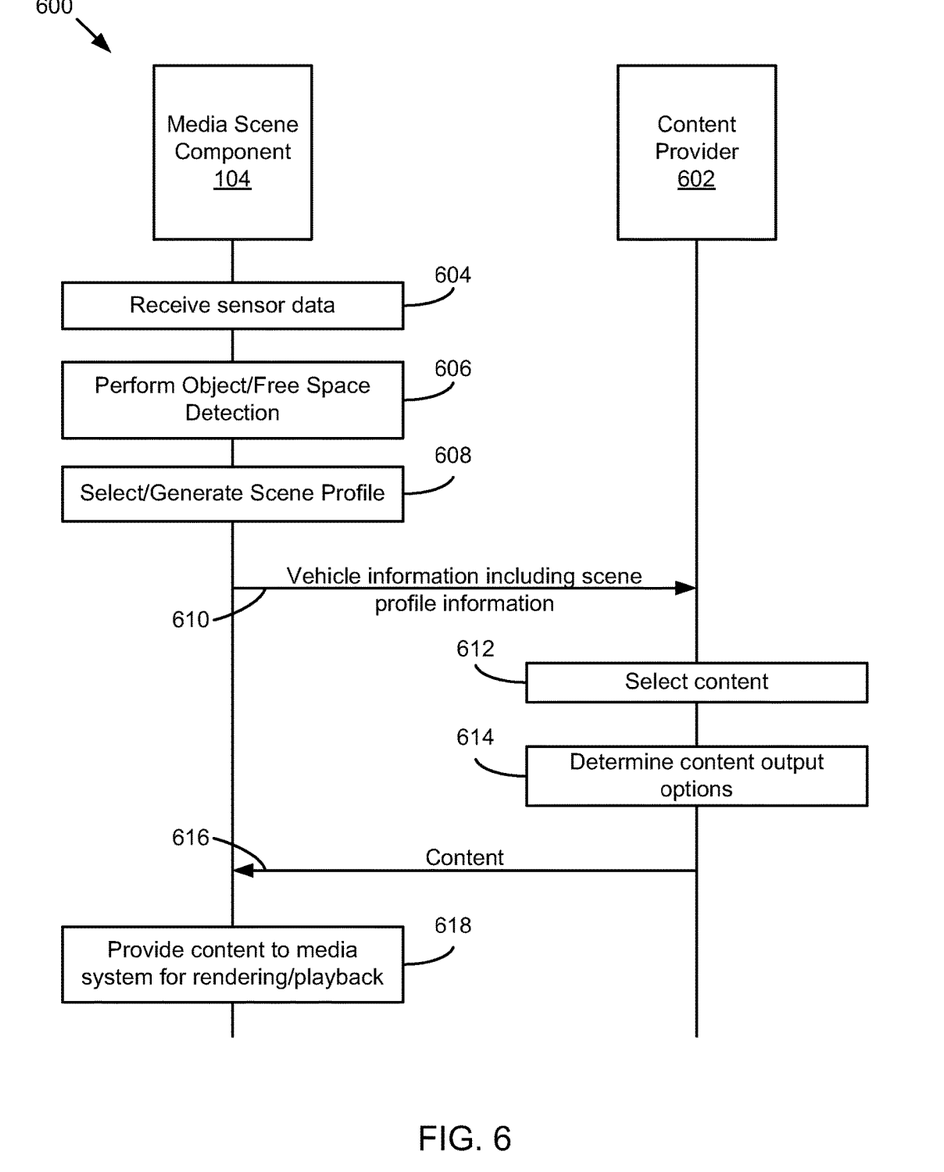
FIG. 6 is a schematic communication flow diagram illustrating a method for providing content in a vehicle, according to one implementation.

FIG. 6 is a schematic communication flow diagram illustrating a method 600 for providing media content based on vehicle sensor data. The method 600 may be performed by a media scene component 104 and a content provider 602.

The method 600 begins and the media scene component 104 receives at 604 sensor data from one or more vehicle sensors. The sensor data may include the same or similar sensor data that is used by an automated driving/assistance system 102 for controlling driving of a vehicle or providing assistance to a human driver. Using the sensor data, the media scene component 104 performs at 606 object recognition and/or free space detection. For example, the media scene component 104 may identify object types and/or determine regions of a display (e.g., regions of a window) that are free of nearby objects.

Based on the detected objects or regions of free space, the media scene component 104 may select or generate at 608 an available scene profile. The scene profile may include display templates that have been generalized to potentially fit a variety of driving situations or environments. A scene profile may indicate regions of a display or window where content may be displayed, the size and aspect ratio of available display regions, current lighting conditions, the types of objects that are present in the surrounding environment, the location of a horizon, noise levels within a cabin, or the like. In one embodiment, the scene profile may be constructed based on the sensor data and may include a list of parameters determined by the vehicle control system 100 based on the sensor data. Example information in a scene template may include one or more of information about a horizon line, an aspect ratio for an available display area, a location of free space with respect to a display, the types and locations of objects present around the vehicle, distances to objects or surfaces, weather conditions, a current geographic location of the vehicle, content guides, lighting conditions, a current speed or velocity of the vehicle, a time of day, a driving time before arriving at a destination, or the like.

The media scene component 104 sends at 610 vehicle information including the scene profile information to the content provider 602. The media scene component 104 may send the data via an API to the content provider. For example, the content provider 602 may request the data via an API or may subscribe to real-time updates in vehicle information or scene profile information. Based on the vehicle information the content provider 602 selects at 612 content for display or playback. For example, the content provider 602 may select at 612 content that best fits the vehicle information/scene profile. The content provider 602 may include a plurality of different content types that provide a functionality or tell a story. For example, the same functionality or story may be provided in a plurality of different ways, using different sizes, locations, or events. Based on the vehicle information, the content provider may select from available content to match the current scene profile. In addition, the content provider 602 may determine at 614 content output options. For example, the content provider 602 may determine one or more specific details for how the content should be displayed. Example details may include brightness, location or movement of content within an available display area, noise level, the presence of closed captioning, or the like.

After determining the content and content output options, the content provider 602 provides at 616 the content to the media scene component 104. The media scene component 104 provides at 618 the content to a media system for rendering or playback. The media scene component 104 and content provider 602 may communicate via an API provided by the media scene component 104. Physical transport of messages or data between the media scene component 104 and content provider 602 may be performed over a wireless or wired connection. In one embodiment, content may be streamed to the media scene component 104. During streaming the media scene component 104 may provide real-time updates for changes in the scene or vehicle information. The content provider 602 may process the updated data to select or modify content that is output.

Figure 7:
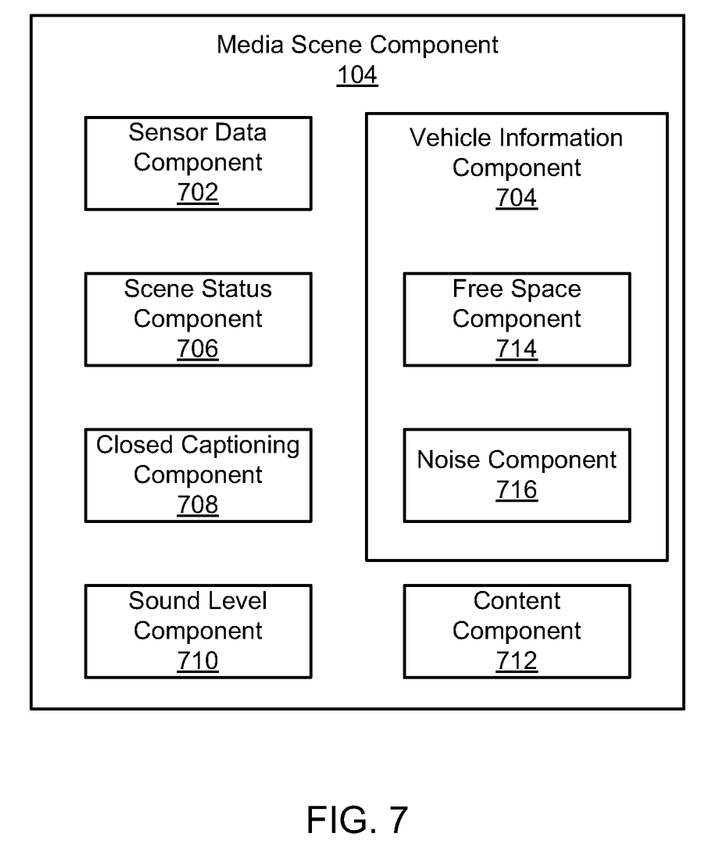
FIG. 7 is a schematic block diagram illustrating example components of a media scene component, according to one implementation.

FIG. 7 is a block diagram illustrating example components of a media scene component 104. In the depicted embodiment, the media scene component 104 includes a sensor data component 702, a vehicle information component 704, a scene status component 706, a closed captioning component 708, a sound level component 710, and a content component 712. The vehicle information component 704 may include a free space component 714 and a noise component 716. The components 702-716 are given by way of illustration only and may not all be included in all embodiments. In fact, some embodiments may include only one or any combination of two or more of the components 702-716. Some of the components 702-716 may be located outside the media scene component 104 such as within a computing device in communication with the media scene component 104 over a network.

The sensor data component 702 is configured to receive sensor data from one or more vehicle sensors. The sensor data may include data from one or more of a camera, a LIDAR system, a radar system, a positioning system, an accelerometer, a rain sensor, or an ambient light sensor.

The vehicle information component 704 is configured to determine vehicle information for providing to a content provider. The vehicle information component 704 may generate vehicle information about an environment or status of the vehicle based on sensor data from the one or more vehicle sensors. In one embodiment, the vehicle information component 704 is configured to determine an availability or priority for one or more display regions for displaying visual content. For example, the vehicle information component 704 may generate or determine any of the data related to a current scene, vehicle status, environmental information, event information, or the like as discussed herein. In one embodiment, the vehicle information component 704 is configured to generate the vehicle information comprising one or more of: current weather conditions; a current location of the vehicle; a current velocity of the vehicle; of a light level within a cabin of the vehicle or driving environment of the vehicle. In one embodiment, the vehicle information component 704 determines an estimated route time or estimated arrival time. The vehicle information component 704 may include a free space component 714 and a noise component 716 for including vehicle information and/or scene profile information.

The free space component 714 is configured to determine regions of free space surrounding a vehicle. For example, the free space component 714 may detect regions that are free from trees, buildings, or other objects or structures. For example, free space may correspond to areas where there is only sky, clouds or only very distant objects. In one embodiment, free space may include locations where there very little contrast or spectral information. For example, free space may include any region where content may be displayed without potentially being obscured or difficult to see. Free space locations may be determined based on image, LIDAR, radar, or other sensor data.

In one embodiment, the free space component 714 performs object detection. For example, the free space component 714 may detect the presence, location, and/or type of object within a field of view of a camera, LIDAR system, or radar system. In one embodiment, the free space component may determine a label or category for each object for inclusion in a scene profile. The free space component 714 may also determine a location on a window or display that corresponds to an object (or the absence of objects). In one embodiment, the free space component 714 may determine a location on a display of a horizon for a human passenger or driver. For example, the free space component 714 may determine a location on the display for a horizon, free space, object, or the like where a passenger or driver looks to see the horizon, object, or free space.

The noise component 716 is configured to determine a noise level within a cabin of a vehicle. In one embodiment, the noise component 716 may determine the noise level by directly sampling the noise level using a microphone internal or external to a cabin of the vehicle. For example, the noise component 716 may determine a number of decibels and/or the frequency content of the noise. In another embodiment, the noise component 716 can indirectly determine or estimate the cabin noise. For example, sensor data may be processed to estimate a current noise level. Example sensor data or other details, which may be used to estimate or infer a noise level, include a current speed of the vehicle (e.g., for tire, wind, and/or engine noise), a current engine RPM (e.g., engine and/or gear noise), the presence or number of nearby vehicles (e.g., noise from other vehicles), vehicle vibration (e.g., due to road surfaces), and/or weather conditions (wind, rain, and/or tire noise).

In one embodiment, based on the data determined by the vehicle information component 704 (including the free space component 714 and the noise component 716), the vehicle information component 704 may generate a scene profile. The scene profile may include any of the information discussed herein and/or may correspond to how data may preferably be displayed by a content provider. The scene template may include details and/or indicate what type of scene may best be displayed under the current circumstances. Example scene types may include: an action scene where lots of movement and action is present and which may require access to large regions of a display or window; a group scene where a large number of people or objects can be displayed; a medium scene where objects are displayed in sufficiently low detail and resolution that only a portion of a display is needed; a text or graphical scene where text or other graphical content may be displayed an in which only small display regions are needed; and/or a close up scene where close up details of a scene is required and in which all or a majority of a display screen may be needed.

The vehicle information and/or scene template information may be periodically generated to allow for frequent or real-time scene modifications to accommodate changing scene or vehicle situations. For example, the current scene may be modified and/or generated every fraction of a second to provide fluid and varying display of content that is in line with the current situation of the vehicle.

The scene status component 706 is configured to provide the vehicle information (including a scene profile) to a content provider. For example, the scene status component 706 may provide any of the data determined by the vehicle information component 704 to the content provider. The vehicle information provided to the content provider may include an indication of the availability (e.g., and any associated priority) of the one or more display regions for displaying content. For example, the display regions may include sections within a logical grid of a display.

The closed captioning component 708 is configured to determine whether closed captioning should be displayed with any displayed content. For example, the closed captioning component 708 may compare a cabin noise level determined by the noise component 716 to determine whether closed captioning should be displayed. In response to determining that the cabin noise level exceeds a threshold, the closed captioning component 708 may trigger display of closed captioning for the content. The closed captioning component 708 may trigger display of closed captioning for the content by providing a request to the content provider for closed captioning and receiving closed captioning information corresponding to the content. The closed captioning component 708 may also deactivate display of the closed captioning in response to determining that the noise level has fallen below a threshold. The closed captioning component 708 may use a first threshold to trigger display of closed captioning and may use a second, lower threshold to deactivate display of closed captioning. The closed captioning component 708 may indicate to a content provider that closed captioning may stop or cease by sending an indication to the content provider.

The sound level component 710 is configured to modifying a sound level for rendering audio content in response to the noise level. For example, as the noise level increases, the sound level component 710 may increase the sound level for audio content. Similarly, when the noise level decreases the sound level component 710 may decrease the sound level for audio content. However, the sound level component 710 may keep the sound level for audio content within a minimum and maximum noise level to avoid damaging hearing and/or maintaining a sound level where drivers or passengers can still hear the content.

The content component 712 is configured to receive content from the content provider. The content received from the content provider may be specifically formatted or modified based on the information generated by the vehicle information component 704. The content component 712 may also provide the received content to a media system for playback or rendering. For example, the media system may include a display configured to display visual content on one or more transparent or reflective surfaces of the vehicle. The content component 712 may provide the content to the media system for display on a window, windshield or other surface or display in the vehicle.

Figure 8:
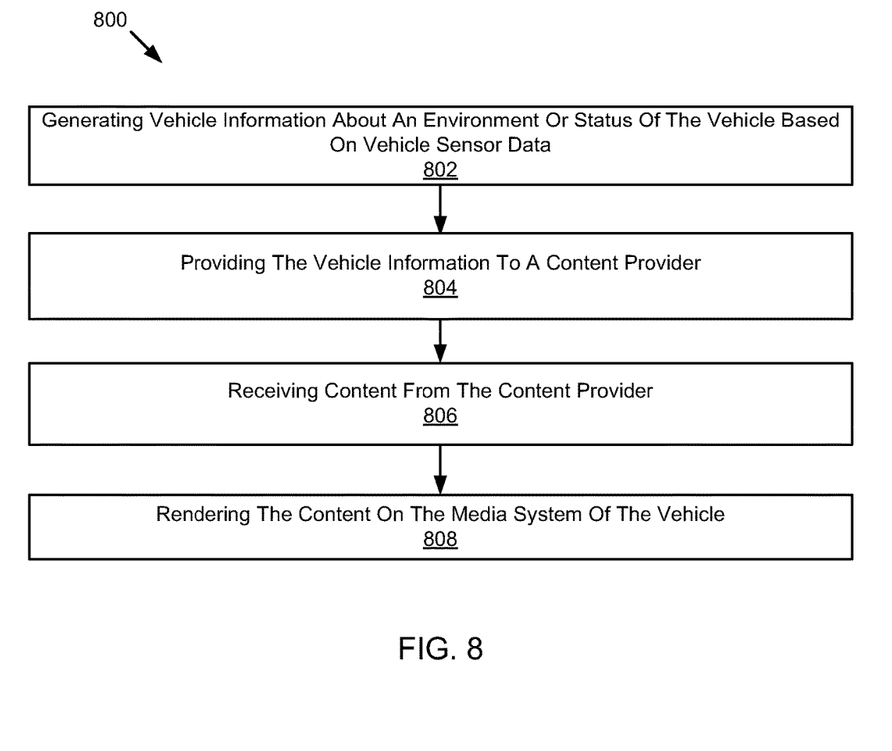
FIG. 8 is a schematic flow chart diagram illustrating a method for providing media content in a vehicle, according to one implementation.

Referring now to FIG. 8, a schematic flow chart diagram of a method 800 for rendering media content in a vehicle is illustrated. The method 800 may be performed by media scene component 104, such as the media scene component 104 of FIG. 1, 6, or 7.

The method 800 begins and a vehicle information component 704 generates at 802 vehicle information about an environment or status of the vehicle based on sensor data from one or more vehicle sensors. A scene status component 706 provides at 804 the vehicle information to a content provider. The vehicle information may include a scene profile for a current situation/environment of the vehicle. The content component 712 receives at 806 content from the content provider, wherein the content is configured for rendering by a media system of the vehicle based on the vehicle information. The content component 712 or a media system renders at 808 the content. For example, the content component 712 may render at 808 the content by providing the content to the media system for rendering/playback. In one embodiment, providing at 804 the vehicle information and receiving at 806 the content may be performed between a media scene component 104 and a content provider via an API.

Figure 9:
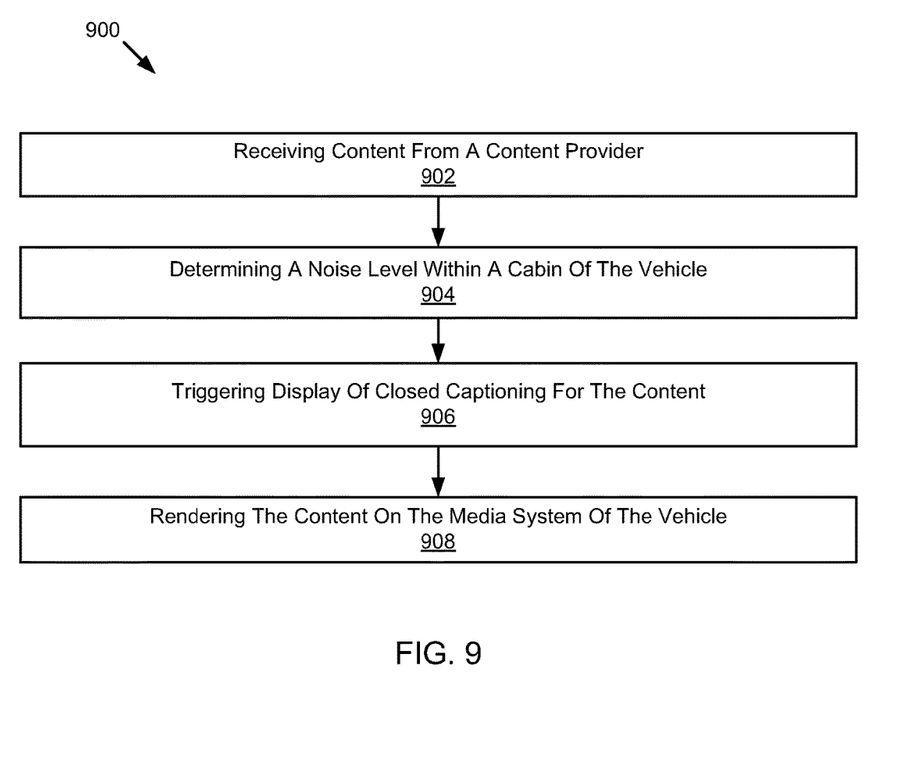
FIG. 9 is a schematic flow chart diagram illustrating a method for providing closed captioning for media content in a vehicle, according to one implementation.

FIG. 9 is a schematic flow chart diagram of a method 900 for rendering media content in a vehicle. The method 900 may be performed by media scene component 104, such as the media scene component 104 of FIG. 1, 6, or 7.

The method 900 begins and a content component 712 receives at 902 content from a content provider, wherein the content is configured for rendering by a media system of a vehicle. A noise component 716 determines at 904 a noise level within a cabin of the vehicle. A closed captioning component 708, in response to determining that the noise level exceeds a threshold, triggers at 906 display of closed captioning for the content. The content component 712 or media system renders at 908 the content on the media system of the vehicle.

EXAMPLES

The following examples pertain to further embodiments.

Example 1 is a method that includes generating vehicle information about an environment or status of the vehicle based on sensor data from one or more vehicle sensors. The method includes providing the vehicle information to a content provider. The method includes receiving content from the content provider, wherein the content is configured for rendering by a media system of the vehicle based on the vehicle information. The method also includes rendering the content on the media system of the vehicle.

In Example 2, the media system of Example 1 includes a display that displays on one or more transparent or reflective surfaces of the vehicle.

In Example 3, generating the vehicle information as in any of Examples 1-2 includes determining an availability or priority for one or more display regions for displaying visual content and providing an indication of the availability or priority for the one or more display regions to the content provider.

In Example 4 receiving the content from the content provider of Example 3 includes receiving content for display within the one or more display regions.

In Example 5, the indication of the availability or priority for the one or more display regions as in any of Examples 3-4 includes an indication for one or more locations within a logical grid of a display.

In Example 6, generating the vehicle information as in any of Examples 1-5 includes one or more of: determining a location on a window corresponding to a horizon for a human passenger or driver; and detecting a region of a display corresponding to free space.

In Example 7, generating the vehicle information as in any of Examples 1-6 includes one or more of: determining an aspect ratio for a display region where content may be displayed; and information indicating requirements for size or location of content to be displayed.

In Example 8, generating the vehicle information as in any of Examples 1-7 includes one or more of: detecting objects within range of a sensor of the vehicle; and determining distance to objects outside the vehicle within sight of a passenger or driver of the vehicle.

In Example 9, generating the vehicle information as in any of Examples 1-8 includes determining one or more of: current weather conditions; a current location of the vehicle; a current velocity of the vehicle; and a light level within a cabin of the vehicle or driving environment of the vehicle.

In Example 10, generating the vehicle information as in any of Examples 1-9 includes determining an estimated route time or estimated arrival time.

Example 11 is a method that includes receiving content from a content provider, wherein the content is configured for rendering by a media system of a vehicle. The method includes determining a noise level within a cabin of the vehicle. The method includes, in response to determining that the noise level exceeds a threshold, triggering display of closed captioning for the content. The method also includes rendering the content on the media system of the vehicle.

In Example 12, triggering display of closed captioning for the content as in Example 11 includes providing a request to the content provider for closed captioning and receiving closed captioning information corresponding to the content.

In Example 13, method of any of Examples 11-12 further includes deactivating display of the closed captioning to the content in response to determining that the noise level is below one or more of: a first threshold comprising the threshold; or a second threshold.

In Example 14, deactivating display of the closed captioning as in Example 13 includes providing an indication to the content provider that closed captioning may cease or stop.

In Example 15, the content in any of Examples 11-14 includes audio content; the method further includes modifying a sound level for rendering the audio content in response to the noise level.

In Example 16, determining the noise level as in any of Examples 11-15 includes determining the noise level based on one or more of: a microphone internal to the cabin; or a microphone external to the cabin.

In Example 17, determining the noise level as in any of Examples 11-16 includes determining an estimated a cabin noise level based on one or more of: a current speed of the vehicle; a current engine rotations per minute (RPM); the presence or number of nearby vehicles; vehicle vibration; or weather conditions.

Example 18 is a system or device that includes means for implementing a method or as in any of Examples 1-17.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   receiving content from a content provider, wherein the content is configured for rendering by a media system of a vehicle;
   detecting a current speed of the vehicle, a current engine rotation speed, a presence or number of nearby vehicles, and a current weather condition based on one or more vehicle sensors;
   determining a noise level within a cabin of the vehicle, wherein determining the noise level comprises determining an estimated cabin noise level based on the current speed of the vehicle, the current engine rotation speed, the presence or number of nearby vehicles, and the current weather conditions;
   in response to determining that the noise level exceeds a threshold, triggering display of closed captioning for the content; and
   rendering the content and closed captioning for the content on the media system of the vehicle.

2. The method of claim 1, wherein triggering display of closed captioning for the content comprises providing a request to the content provider for closed captioning and receiving closed captioning information corresponding to the content.

3. The method of claim 1, further comprising deactivating display of the closed captioning to the content in response to determining that the noise level is below one or more of:
   a first threshold comprising the threshold; or
   a second threshold.

4. The method of claim 3, wherein deactivating display of the closed captioning comprises providing an indication to the content provider that closed captioning may cease.

5. The method of claim 1, wherein the content comprises audio content, the method further comprising modifying a sound level for rendering the audio content in response to the noise level.

6. The method of claim 1, wherein determining the noise level further comprises determining the noise level based on one or more of:
   a microphone internal to the cabin; or
   a microphone external to the cabin.

7. The method of claim 1, further comprising determining an availability of one or more display regions on a heads-up display for displaying visual content, wherein determining the availability of one or more display regions on a heads-up display comprises determining an area of a window or windshield where there are no objects from the perspective of a passenger;
   wherein rendering the closed captioning comprises rendering in an available region of the one or more display regions on the heads-up display.

8. A system comprising:
   a media system for rendering one or more of audio or visual content;
   a content component configured to receive content from a content provider, wherein the content is configured for rendering by the media system of a vehicle;
   a sensor component configured to detect a current speed of the vehicle, a current engine rotation speed, a presence or number of nearby vehicles, and a current weather condition based on one or more vehicle sensors;
   a noise component configured to determine a noise level within a cabin of the vehicle, wherein determining the noise level comprises determining an estimated cabin noise level based on the current speed of the vehicle, the current engine rotation speed, the presence or number of nearby vehicles, and the current weather conditions; and
   a closed captioning component configured to, in response to determining that the noise level exceeds a threshold, trigger display of closed captioning for the content.

9. The system of claim 8, wherein the closed captioning component is configured to trigger display of closed captioning for the content by providing a request to the content provider for closed captioning and receiving closed captioning information corresponding to the content.

10. The system of claim 8, further wherein the closed captioning component is further configured to deactivate display of the closed captioning for the content in response to determining that the noise level is below one or more of:
    a first threshold comprising the threshold; or
    a second threshold.

11. The method of claim 10, wherein the closed captioning component is configured to deactivate display of the closed captioning by providing a request to the content provider to stop closed captioning.

12. The system of claim 8, wherein the content comprises audio content, further comprising a sound level component configured to modify a sound level for rendering the audio content in response to the noise level.

13. The system of claim 8, wherein the system further comprises one or more of:
    a microphone internal to the cabin; or
    a microphone external to the cabin;
    and wherein the noise component is further configured to determine the noise level based on one or more of the microphone internal to the cabin or the microphone external to the cabin.

14. The system of claim 8, further comprising a vehicle information component configured to determine an availability of one or more display regions on a heads-up display for displaying visual content;
  wherein the media system renders the closed captioning in an available region of the one or more display regions on the heads-up display.

15. Non-transitory computer readable storage media storing instructions that, when executed by one or more processors, cause the processors to:
  receive content from a content provider, wherein the content is configured for rendering by a media system of a vehicle;
  detect a current speed of the vehicle, a current engine rotation speed, a presence or number of nearby vehicles, and a current weather condition based on one or more vehicle sensors;
  determine a noise level within a cabin of the vehicle, wherein determining the noise level comprises determining an estimated cabin noise level based on a current speed of the vehicle, a current engine rotation speed, a presence or number of nearby vehicles, vehicle vibration, and current weather conditions;
  in response to determining that the noise level exceeds a threshold, trigger display of closed captioning for the content; and
  render the content and closed captioning for the content on the media system of the vehicle.

16. The non-transitory computer readable storage media of claim 15, wherein the instructions cause the processors to trigger display of closed captioning for the content by providing a request to the content provider for closed captioning and receiving closed captioning information corresponding to the content.

17. The non-transitory computer readable storage media of claim 15, wherein the instructions further cause the processors to deactivate display of the closed captioning to the content in response to determining that the noise level is below one or more of:
  a first threshold comprising the threshold; or
  a second threshold.

18. The non-transitory computer readable storage media of claim 17, wherein the instructions cause the processors to deactivate display of the closed captioning by providing an indication to the content provider to stop displaying closed captioning.

19. The non-transitory computer readable storage media of claim 15, wherein the instructions cause the processors to modifying a sound level for rendering the audio content in response to the noise level.

20. The non-transitory computer readable storage media of claim 15, wherein the instructions further cause the one or more processors to determining an availability of one or more display regions on a heads-up display for displaying visual content;
  wherein rendering the closed captioning comprises rendering in an available region of the one or more display regions on the heads-up display.

* * * * *